W. H. FAHRNEY.
SPRING VEHICLE WHEEL.
APPLICATION FILED DEC. 14, 1912.

1,066,191.

Patented July 1, 1913.

2 SHEETS—SHEET 2.

UNITED STATES PATENT OFFICE.

WILLIAM H. FAHRNEY, OF CHICAGO, ILLINOIS.

SPRING VEHICLE-WHEEL.

1,066,191.  Specification of Letters Patent.  Patented July 1, 1913.

Application filed December 14, 1912. Serial No. 736,729.

*To all whom it may concern:*

Be it known that I, WILLIAM H. FAHRNEY, a citizen of the United States, residing at Chicago, in the county of Cook and State of Illinois, have invented a new and useful Improvement in Spring Vehicle-Wheels, of which the following is a specification.

My invention relates to an improvement in the class of spring vehicle-wheels, in which the body of the wheel, or wheel-center, is suspended on one or more annular band-springs through the medium of clips extending inwardly therefrom, at intervals, and having trunnion-like projections working in openings in a pair of annular metal plates about the wheel-rim near its edges and forming the space into which the clips extend. The theory upon which a wheel of the construction thus generally described operates, is that the normally-circular band-spring is flexed by the stresses of the load into more or less elliptical shape in producing its resilient action, dependence being had, for such flexure, on the limited movement of the aforesaid trunnion-like projections in the plate-openings confining them.

The object of my invention is to provide a construction of the trunnion-like projection which shall adapt it to yield freely and resiliently with the flexure of the annular band-spring, thus without, in any way, hampering the freedom of its flexure.

Figure 1:
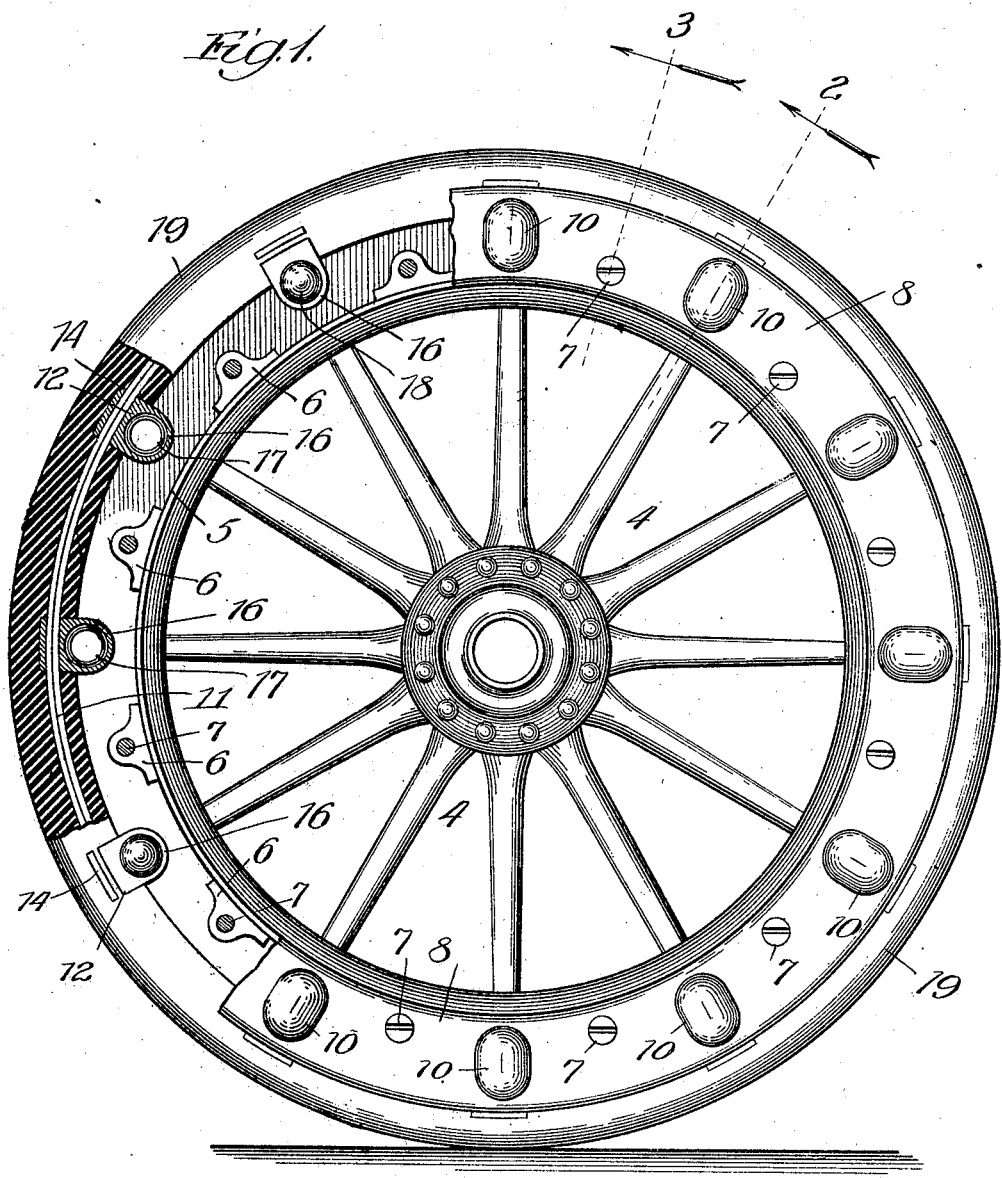
Figure 2:
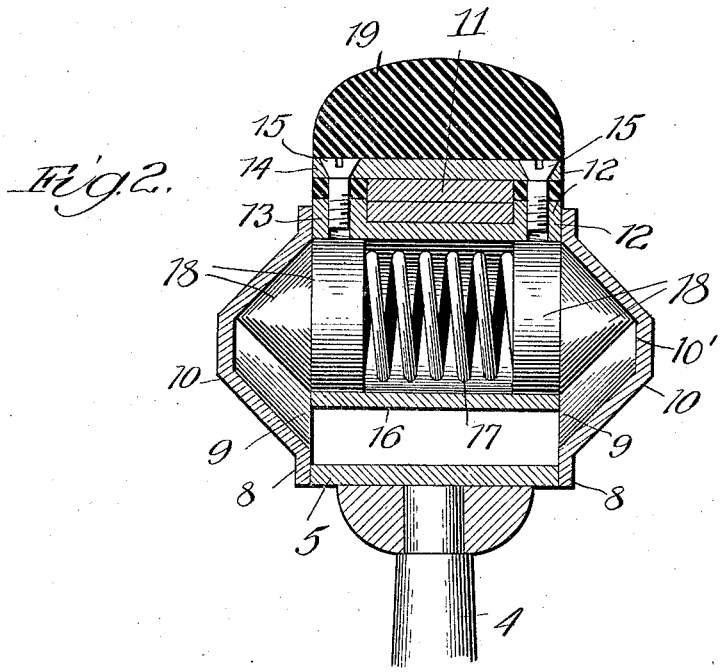
Figure 3:
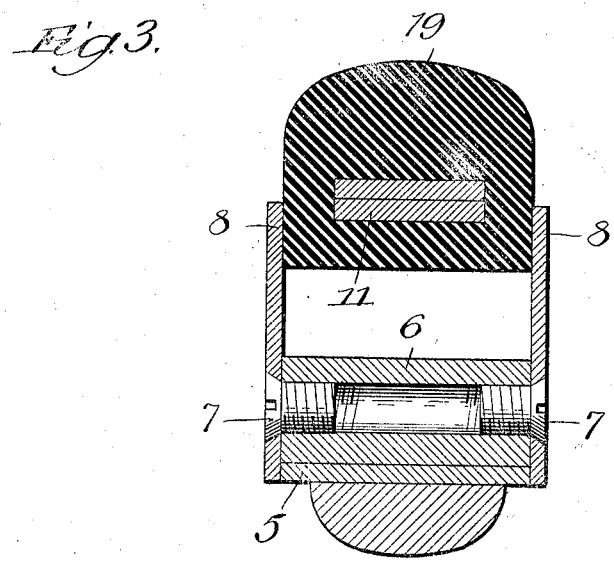

In the accompanying drawing, Figure 1 shows a wheel of my improved construction by a view in side elevation, with a portion of one of the annular plates and a portion of the tire broken away to disclose details; Fig. 2 is an enlarged section on line 2, Fig. 1, and Fig. 3 is an enlarged section on line 3, Fig. 1.

The wheel-center 4, which may be of any desired construction, including that illustrated, has its rim 5 provided at intervals with bearings 6 for screws 7 to securely fasten about the rim-edges, plates 8, 8. These plates are provided at uniform intervals with openings 9, and each opening is covered by a cap 10 of the preferred form best illustrated in Fig. 2, presenting outwardly-converging angular walls for the purpose hereinafter explained. An annular band-spring 11, shown to be formed of two endless bands, one within the other, surrounds the rim in spaced relation thereto and carries, at intervals bringing them midway between bearings 6, clips 12 formed on their outer faces with end-lugs 13 to embrace at its edges the band-spring, to which each clip is clamped by a cross-strip 14 through the medium of screw-studs 15 passing through the strip near its ends into the lugs. On the inner end of each clip is a tubular housing 16 to register at its ends with opposite caps 10 and confine a spiral spring 17 under compression between two similar outwardly-tapering trunnion-like studs 18, 18, for carrying at their tapering-ends the wheel-center on the spring 11 at the caps 10, which are formed with outwardly converging angular wall-sections and a straight vertical wall-section 10' intermediate said converging sections. The tire 19 is flexible, being preferably rubber molded about and thus embedding the spring 11 and outer portions of the clips thereon.

In the running of a wheel of the described construction, the flexure of the spring 11 (and of the tire embedding it) under the load, easily rides the angular wall-surfaces of the caps 10 against the tapering surfaces of the spring-pressed studs 18 conforming thereto, by causing the latter to move resiliently in the inward and outward directions under the wedging action against them of these wall-surfaces. The spring-pressed studs 18 travel the vertical wall sections of the caps 10 without acting on the springs 17 confined between them.

I realize that considerable variation is possible in the details of construction of my improvement thus specifically shown and described, and I do not intend by illustrating a single, specific or preferred form, to limit my invention thereto; my intention being, in the following claims, to claim protection upon all the novelty there may be in the device as broadly as the state of the art will permit.

What I claim as new and desire to secure by Letters Patent is:—

1. In a spring vehicle-wheel, the combination with a wheel-center, of a band-spring about and spaced from the rim, annular side-plates on the rim provided at intervals with openings, caps covering said openings and having outwardly converging angular wall-sections and a straight vertical section intermediate said angular sections, and means yieldingly carrying the wheel-center on the band-spring, comprising outwardly spring-pressed studs about the band-spring projecting into said openings, the said spring-pressed studs being so proportioned relative to the caps as to travel the vertical wall-sections without acting on the springs confined between them.

2. In a spring vehicle-wheel, the combination with a wheel-center, of a band-spring about and spaced from the rim, annular side-plates on the rim provided at intervals with openings, caps covering said openings and having outwardly converging angular wall-sections and a straight vertical section intermediate said angular sections, clips at intervals on the spring, provided on their inner ends with housings, and spring-pressed studs projecting from the opposite ends of said housings into said caps to work therein and carry the wheel-center on the band-spring; the said spring-pressed studs being so proportioned relative to the caps as to travel the vertical wall sections without acting on the springs confined between them.

3. In a spring vehicle-wheel, the combination with a wheel-center, of a band-spring about and spaced from the rim, annular side-plates on the rim provided at intervals with openings, caps covering said openings and having outwardly converging angular wall-sections and a straight vertical section intermediate said angular sections, clips at intervals on the spring, provided on their inner ends with housings, studs in the outer ends of said housings having tapering ends projecting into said caps to engage the walls thereof and carry the wheel-center on said spring, springs confined in the housings between the studs therein, the said spring-pressed studs being so proportioned relative to the caps as to travel the vertical wall sections without acting on the springs confined between them.

WILLIAM H. FAHRNEY.

In presence of—
  JAMES G. JONES,
  C. E. HITCHINGS.